United States Patent
Hsu et al.

(10) Patent No.: US 6,389,176 B1
(45) Date of Patent: May 14, 2002

(54) SYSTEM, METHOD AND MEDIUM FOR INCREASING COMPRESSION OF AN IMAGE WHILE MINIMIZING IMAGE DEGRADATION

(75) Inventors: Charles C. Hsu, McLean; Mark J. Sandford, Manassas; Joseph S. Landa, Alexandria, all of VA (US)

(73) Assignee: Trident Systems, Inc., Fairfax, VA (US)

(*) Notice: Subject to any disclaimer, the term of this patent is extended or adjusted under 35 U.S.C. 154(b) by 0 days.

(21) Appl. No.: 09/160,301

(22) Filed: Sep. 25, 1998

Related U.S. Application Data

(60) Provisional application No. 60/060,169, filed on Sep. 26, 1997.

(51) Int. Cl.[7] .................................................. G06K 3/40
(52) U.S. Cl. ...................... 382/254; 382/248; 382/266; 382/298
(58) Field of Search ................................. 382/284, 298, 382/248, 254, 266, 260, 199, 277

(56) References Cited

U.S. PATENT DOCUMENTS

| | | | | |
|---|---|---|---|---|
| 5,631,983 A | | 5/1997 | Ohnishi et al. | 382/284 |
| 5,649,031 A | * | 7/1997 | Nakamura et al. | 382/254 |
| 5,802,481 A | | 9/1998 | Prieto | 702/190 |
| 5,832,141 A | | 11/1998 | Ishida et al. | 382/298 |
| 6,009,447 A | * | 12/1999 | Kubota et al. | 708/313 |
| 6,018,596 A | * | 1/2000 | Wilkinson | 382/260 |

* cited by examiner

*Primary Examiner*—Yon J. Couso
(74) *Attorney, Agent, or Firm*—Hunton & Williams

(57) ABSTRACT

The present invention relates to an image/video enhancement system and method for transmission of the image/video. The system processes an image before transmission using a pre-processor and then de-processes it after transmission using a post-processor. The pre-processor increases the compression ratio of the compression scheme used by the transmission system without losing image quality. The post-processor restores the transmitted image to a high-quality image.

16 Claims, 11 Drawing Sheets

SYSTEM, METHOD AND MEDIUM FOR INCREASING COMPRESSION OF AN IMAGE WHILE MINIMIZING IMAGE DEGRADATION

This application claims the benefit of provisional application No. 60/060,169, filed Sep. 26, 1997.

BACKGROUND OF THE INVENTION

1. Field of the Invention

The invention generally relates to image/video processing and, more specifically, relates to image/video compression, transmission, and decompression while minimizing degradation.

2. Description of Related Art

In recent years, the market for visual communications has exploded market due to advances in image/video compression and to the maturity of digital signal processors (DSP) and Very Large Scale Integrated (VLSI) technologies. Hereafter, "image" will refer to still frame images and video. Image transmission/compression standards such as those of the Motion Photographic Expert Group (MPEG), the Motion Joint Photographic Expert Group (Motion JPEG) and the International Telegraph and Telephone Consultative Committee (CCITT) H.261, and H.263 were ratified for the applications of digital video disc, digital satellite TV, digital video phone, video/teleconferencing, and related telecommunication systems. However, these standards do not adequately meet the need for the processing of image signals in real-time at a low transmission rates (including, for example, 28.8 KB per second) with acceptable image quality. Currently, technological obstacles exist in obtaining high levels of image compression with high fidelity utilizing conventional and practiced image processing techniques. For example, systems implementing the above standards fail to adequately handle high volumes of data with acceptable image data loss. Therefore, seeking an image enhancement system and method is as important as seeking a high fidelity image compression system and method.

Since the development of digital signal processes in the early 1980's, the wavelet transform (WT) has been widely embraced by the scientific community, displacing the Fourier transform for mathematical analysis. In recent years, a digital form of the wavelet transform called the Discrete Wavelet Transform (DWT) has become a conventional tool for image processing and image compression. The DWT is a lossless transform, which is used to form an orthonormal basis of some and a dilated master function over a range of, shift and dilation parameters. The principle behind the wavelet transform is to hierarchically decompose the input signals into a series of successively lower resolution reference signals and their associated detail signals. At each level, the reference signals and detailed signals contain the information needed for reconstruction back to the next higher resolution level. The Inverse Discrete Wavelet Transform (IDWT) is the inverse function of the DWT. The one-dimensional DWT (1D DWT) processing can be described in terms of a filter bank, wherein an input signal is analyzed in both low and high frequency bands. A separable two-dimensional DWT (2D DWT) process is an extension of the 1D DWT. Specifically, in the 2D DWT process, separable filter banks are applied first horizontally and then vertically. Application of a filter bank comprising two filters, first horizontally then vertically, gives rise to an analysis in four frequency bands: horizontal low—vertical low; horizontal low—vertical high; horizontal high—vertical low; and horizontal high—vertical high. Each resulting band is encoded according to its own statistics for transmission from a coding station to a receiving station. However, constraints exist on how filters can be designed and/or selected, including the need to output perfect reconstructed versions of initially input data, the finite-length of the filters, and a regularity requirement that the iterated low pass filters involve convergence to continuous functions. Further, the implementation of the DWT per se in line with the above constraints for image processing and de-processing fails to meet the desired throughput over low bandwidth communications channels.

SUMMARY OF INVENTION

The present invention relates to an image/video enhancement system, method, and medium. Through the use of a preprocessor and a postprocessor, an image may be placed in a better condition for transmission/compression without significant image loss. In one embodiment, the preprocessor formats the received image to a predefined size, enhances the edges of elements within the image, and eliminates useless image information. The postprocessor restores the received image to a high-quality resultant image.

BRIEF DESCRIPTION OF THE DRAWINGS

The advantages of the present invention will become apparent to one of ordinary skill in the art when the following description of the preferred embodiments of the invention is taken into consideration with the accompanying drawings where like numerals refer to like or equivalent parts and in which.

DETAILED DESCRIPTION OF THE INVENTION

Figure 1:
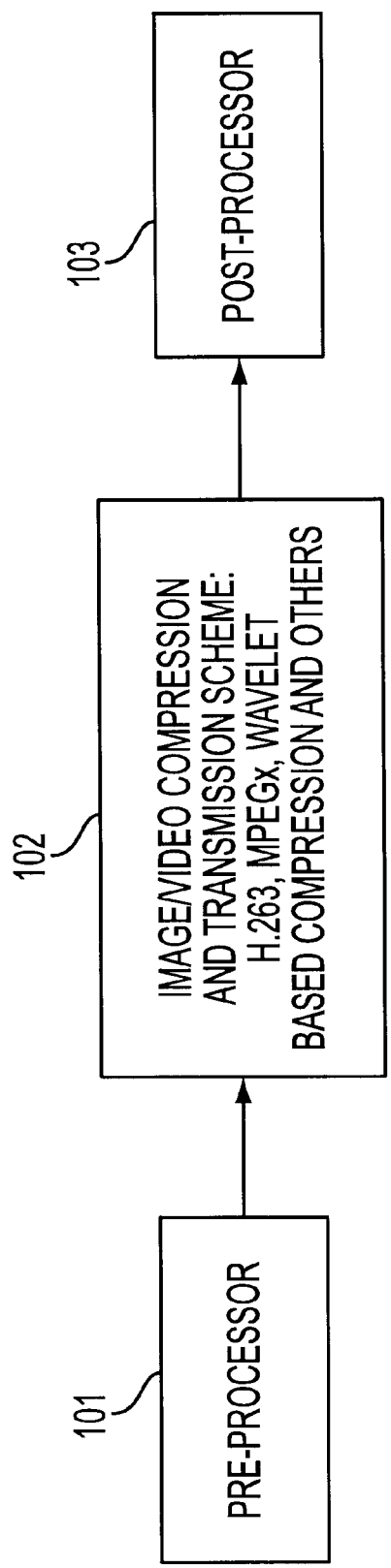
FIG. 1 shows the overall processing structure in accordance with embodiments of the present invention.

FIG. 1 describes an overview of the system described herein. An image is received by a pre-processor 101, processed then output to the compression/transmission system 102. The compression/transmission system uses at least one of known compression/transmission systems including H.263, MPEGx, Wavelet-based compression and other compression/transmission systems. The system invention described herein, at least in part, processes the image before transmission using a pre-processor 101 and then de-processes it after transmission using a post-processor 103. One of the goals of the pre-processor is to increase the compression ratio of the compression scheme used by the transmission/compression system 102 without losing image quality. Before transmission, the pre-processor resizes the input image to the correct dimensions, enhances the image and then clears the image of irrelevant data, thereby increasing the compression ratio during transmission. One of the goals of the post-processor is to restore the transmitted image to a high-quality image. After transmission, the post-processor enhances edge information, smoothes out object information in order to eliminate noise and reconstructs a high-quality image.

As discussed above, the system may work with Discrete Cosine Transform (DCT) based compression algorithms such as H.263, wavelet based compression algorithms, MPEGx and other image/video compression algorithms. The DCT, much like a Fourier Transform, may be used, for example, to represent an image in units of the cosine function. In addition, the pre-processor and the post-processor of the invention described herein may be applied to the receiver and transmitter independently. Furthermore, the system may be implemented in hardware or software for real-time processing. While the system is directed to the use of a DWT, it will be appreciated by those skilled in the art that other transforms may be used to accomplish the same goals.

One implementation of the invention may be in hardware processing environment taking the form of Application Specific Integrated Circuits (ASICs) or a Field Programmable Gate Arrays (FPGAs). Of ASICs and FPGAs, the ASIC environment is preferred because of the higher processing capabilities.

Figure 11:
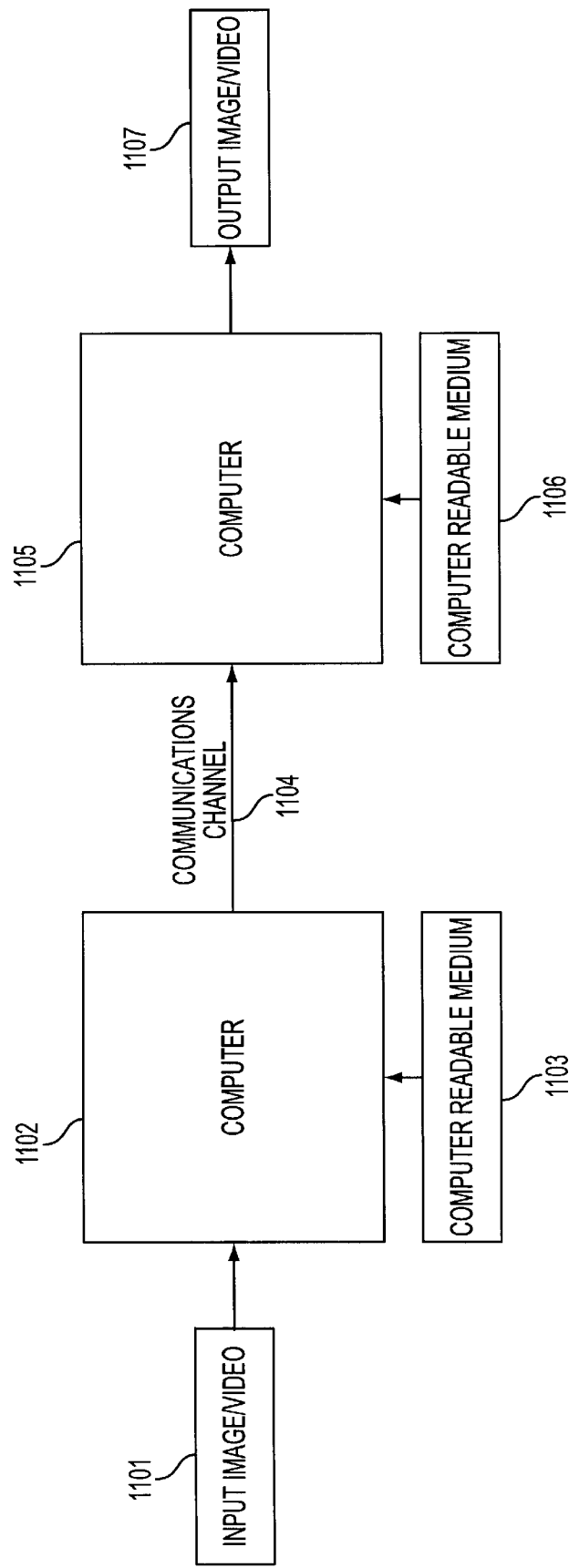
FIG. 11 shows an implementation of the invention in accordance with embodiments of the present invention.

It is apparent to one skilled in the art that the invention described herein is also capable of being embodied in a software environment. In such an embodiment, the pre-processor and the post-processor exist as computer readable instructions located on a computer readable medium that would be executed by a computer. FIG. 11 describes one possible embodiment of the invention in a software environment. It includes the input data 1101, the invention software 1103, 1106, the sending and receiving computers 1102, 1105, the communications channel 1104 and the output data 1107. A computer for supporting the preprocessor and postprocessor may include, for example, a 300 Mhz processor, 32 Megs of RAM, 2 gig HD. Also, Sharc board (by the Alex Computer Systems Inc.) may be used to support a software implementation to quicken response times.

Pre-processor

Figure 2:
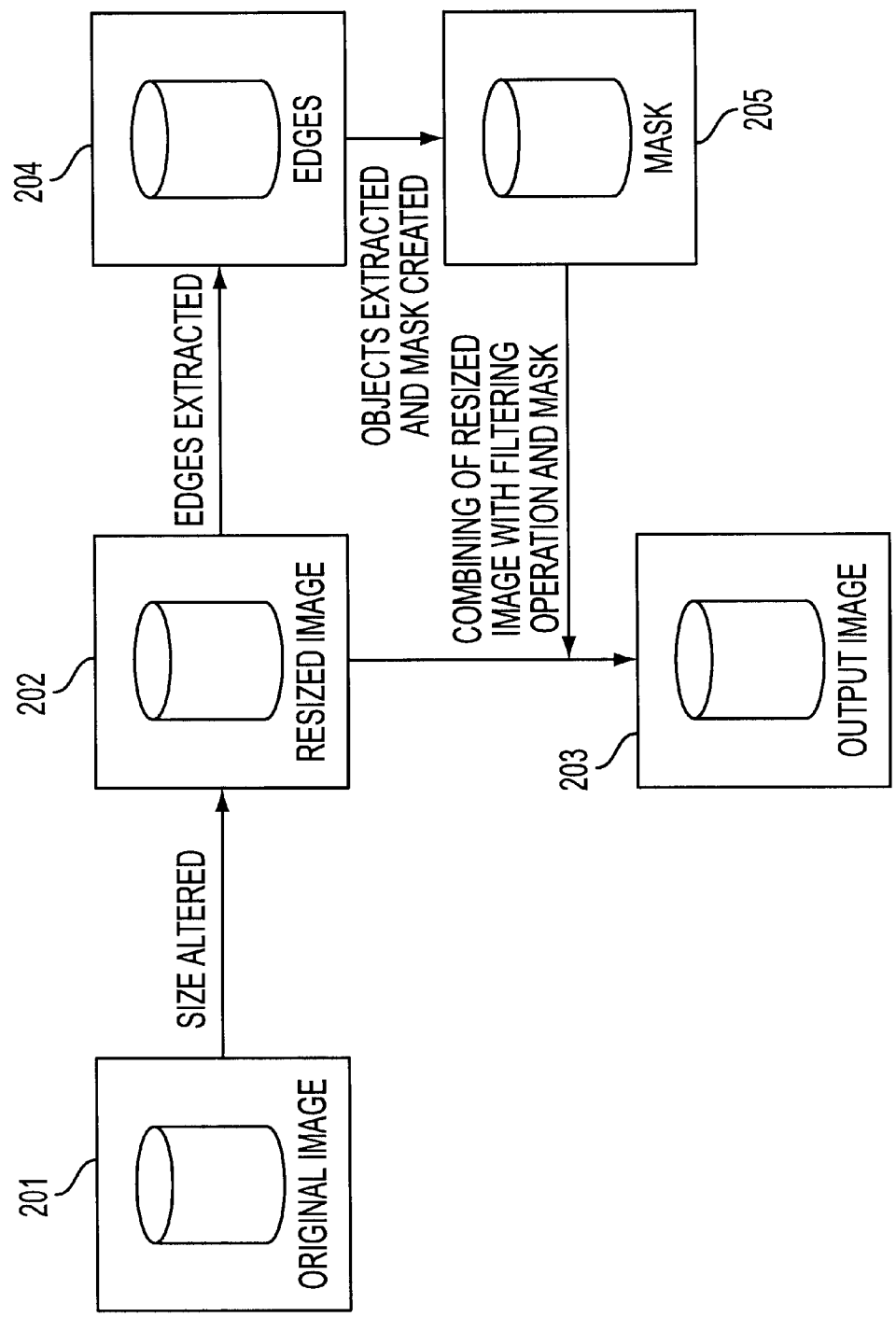
FIG. 2 shows the structure of the pre-processor in accordance with embodiments of the present invention.

In a well-defined system (a system where the expected input values are within a certain range), a pre-processor assists in the image compressing process since noise may be introduced into the input signals during transmission or through the digitizing process of video capturing. Some of the goals of the pre-processor are to reduce the level of noise in the transmitted video signals and smooth the high frequency pixels in order to increase the compression ratio with acceptable image fidelity. Major functions of the pre-processor of the invention include image resizing, edge extraction, object extraction, and filtering operations. FIG. 2 shows the pre-processor structure.

The operational procedure of the pre-processor of the invention is described as follows. The process begins with the input of an original image 201. The original image or video may be any size. The original image may then be resized 202 to the dimensions required by the transmission/compression scheme. The H.263 standard, for example, requires that transmitted images have QCIF (176 by 288 pixels) dimensions. Image resizing can be accomplished using standard pixel doubling, pixel decimation and pixel averaging techniques. Next, the edge extraction filter is applied horizontally and vertically to the resized image to yield an edge-enhanced image. Then a binary image 204 of the edges is produced from the edge-enhanced image. The binary image of the edges can be produced from the edge enhanced image using a threshold technique. Subsequently, the binary image of the edges is dilated and eroded to produce a binary mask image 205. Lastly, the final output image 203 is produced in an operation that combines the binary mask image, the resized image of the original and filtering operations. The operation is described as follows:

$$\text{Result}=s*\text{filter}(R, m_i)*M+s*\text{filter}(R, g_i)*(1-M).$$

Where s is the strength of the filtering operation, the filtering operation can be one-dimensional or two-dimensional or both, $m_i$ is the enhance filter with i-tap coefficients, $g_i$ is the smooth filter with i-tap coefficients, M is the binary mask image, and R is the resized image of the original.

Post-processor

Figure 3:
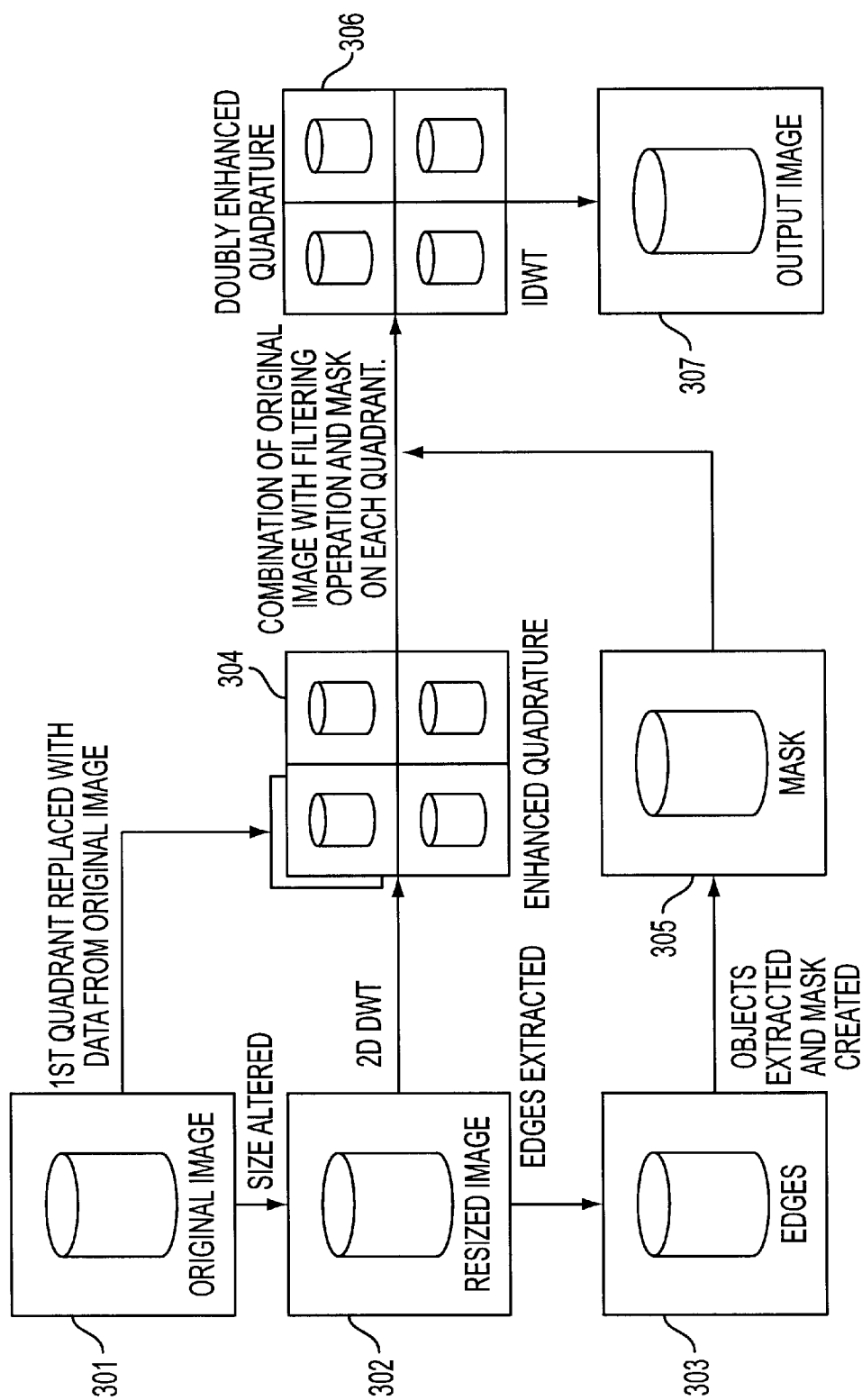
FIG. 3 shows the structure of the post-processor in accordance with embodiments of the present invention.

The post-processor goals are to reduce the noise levels in the reconstructed image/video signals, enhance the edge information, and resize the received image to appropriate dimensions. The major functions of the post-processor may include image resizing, edge extraction, object extraction, DWT, IDWT, and filtering operations. FIG. 3 shows the structure of the post-processor.

The operational procedure of the post-processor of the invention is described as follows. The process begins with the received image 301. The received image or video may be any size. The received image is then resized 302 to the dimensions required by the display scheme. Image resizing can be accomplished using standard pixel doubling and pixel averaging techniques as is know in the art. Next, the edge extraction filter is applied horizontally and vertically to the resized image to yield an edge-enhanced image. Then a binary image 303 of the edges is produced from the edge-enhanced image. The binary image of the edges can be produced using a threshold technique. Subsequently, the binary image of the edges is dilated and eroded to produce a binary mask image 305. Next, a DWT is applied to the resized image of the original and the upper left quadrant of quadrature is replaced with data from the resized image, thereby producing an enhanced quadrature 304. Then an operation is performed on each quadrant involving the binary mask image, the resized image, and filter operations to produce a doubly enhanced quadrature 306. The operations on the enhanced quadrature are performed as follows:

quadrant $1=s*\text{filter}(Q1, m_i).*M+s*\text{filter}(Q1, g_i).*(1-M)$ quadrant $2=s*\text{filter}(Q2, m_i).*M+s*\text{filter}(Q2, g_i).*(1-M)$ quadrant $3=s*\text{filter}(Q3, m_i).*M+s*\text{filter}(Q3, g_i).*(1-M)$ quadrant $4=s*\text{filter}(Q4, m_i).*M+s*\text{filter}(Q4, g_i).*(1-M)$ Where s is the strength of the filtering operation, filtering operations can be one-dimensional and two-dimensional, $m_i$ is the enhance filter with i-tap coefficients, $g_i$ is the smooth filter with i-tap coefficients, M is the binary masked image, Qn is the nth quadrant in the quadrature. Lastly, the IDWT is applied to the quadrature to produce the output image 307.

Edge and Feature Extraction

Figure 4C:
FIG. 4 shows an example of the manipulation of an image in edge/feature extraction using a Sobel edge filter in accordance with embodiments of the present invention.
Figure 4B:
Figure 4A:
Figure 5A:
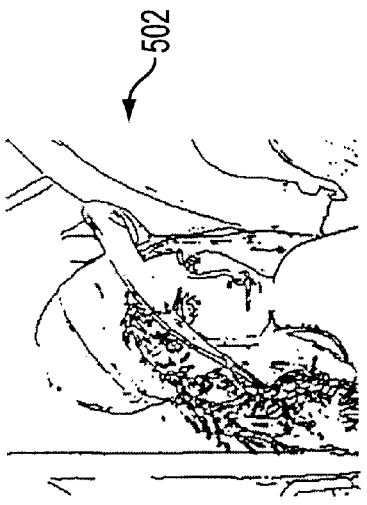
FIG. 5 shows an example of the manipulation of an image in object extraction using dilation and erosion operations in accordance with embodiments of the present invention.
Figure 5B:
Figure 5C:
Figure 5D:

The edges of an image hold much of the information in that image. The edges describe the location, shape, size, and texture of objects in the image. An edge is where the intensity of an image changes from a low value to a high value or vice versa. The high pass filter is used in image processing to detect edges. To detect the horizontal edge information of an image, the image is filtered by a horizontal edge filter and subsequently processed by a threshold operation. The vertical edge information may be detected by the same procedure using vertical edge filters. FIG. 4 shows the original image 401, the horizontal edge information 402, and the vertical edge information 403 as extracted.

Object Extraction

There are generally two operations in object extraction: the dilation operation and the erosion operation. Both operations are known to those of ordinary skill in the image manipulation art. Given the edge information, the dilation operation will add pixels to the boundary of the edges. In contrast, the erosion operation removes the pixels from the boundaries. The object extraction routine processes the dilation operation N times followed by the erosion operation N times. FIG. 5 shows the original image 501, the edge information 502, the dilated edge 503, and the object extraction respectively 504.

Discrete Wavelet Transform and Inverse Discrete Transform

Figure 6:
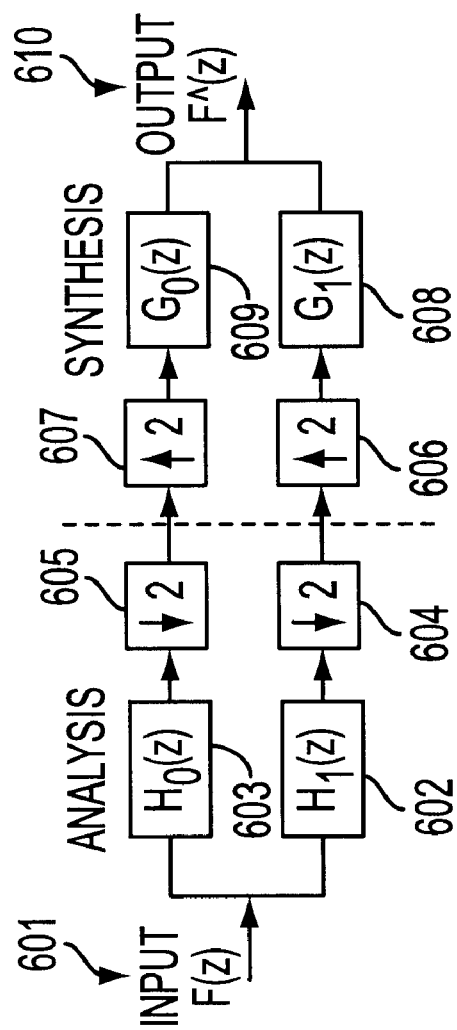
FIG. 6 shows a 1D DWT analysis in accordance with embodiments of the present invention.

One principle behind the wavelet transform is to hierarchically decompose the input signals into a series of successively lower resolution reference signals and their associated detail signals. At each level, the reference signals and detail signals contain the information needed to be reconstructed back to the next higher resolution level. The 1D DWT (the separable 2D case is a straightforward extension) may be described in terms of the filter bank as shown in FIG. 6. The DWT is related to the Sub-band Coding & Quadrature Mirror Filter (QMF), and to the Laplacian Pyramid (LP) in Computer Vision.

$H_0$ is denoted as a low pass filter 603 and $H_1$ as a high pass filter 602 in the "Analysis" process. In the "Synthesis" operations, $G_0$ is denoted as a low pass filter 609 and $G_1$ as a high pass filter 608. The filtering function in digital signal processing is a convolution operation. The basic Multiple Resolution Analysis (MRA) in terms of QMF is schematically shown in FIG. 6. An input signal F(z) 601 is input to the analysis low pass filter $H_0(z)$ and the analysis high pass filter $H_1(z)$. The odd samples of the filtered outputs may be discarded, corresponding to decimation by a factor of two in elements 604 and 605. The decimation outputs of these filters constitute the reference signal $r_1(z)$ and detailed signal $d_1(z)$ for a one level decomposition. In the synthesis process (reconstruction), interpolation by a factor of two in elements 607 and 606 is performed, followed by filtering using the low pass and high pass synthesis filter $G_0(z)$ and $G_1(z)$ resulting in the output signal 610. Constraints on filter design include perfect reconstruction (lossless in terms of image quality), finite-length (finite number of taps in the filter with no feedback), and regularity (the filter convolved upon itself will converge) so that the iterated low pass filters may converge to continuous functions.

To provide a lossless QMF design, we apply the discrete filter bank theory to the scaling $H_0$ filter via the standard z-transform:

$$H_0(z) = \sum_{k=0} c_k z^{-k} \qquad (1)$$

and likewise a wavelet $H_1$ filter:

$$H_1(z) = \sum_{k=0} d_k z^{-k} \qquad (2)$$

From the theory of filter banks, one should note that in order to eliminate aliasing, the following relations must be satisfied.

$$G_1(z)=(-1)^{n+1}H_0(z) \qquad (3)$$

$$H_1(z)=(-1)^n G_0(z) \qquad (4)$$

From FIG. 6, we may obtain equation (5). If equation (3) and (4) are satisfied, $F(z)=F^{\wedge}(z)$.

$$F^{\wedge}(z)=1/2\{F(z)H_0(z)+F(-z)H_0(-z)\}G_0+1/2\{F(z)H_1(z)+F(-z)H_1(-z)\}G_1 \qquad (5)$$

Figure 7:
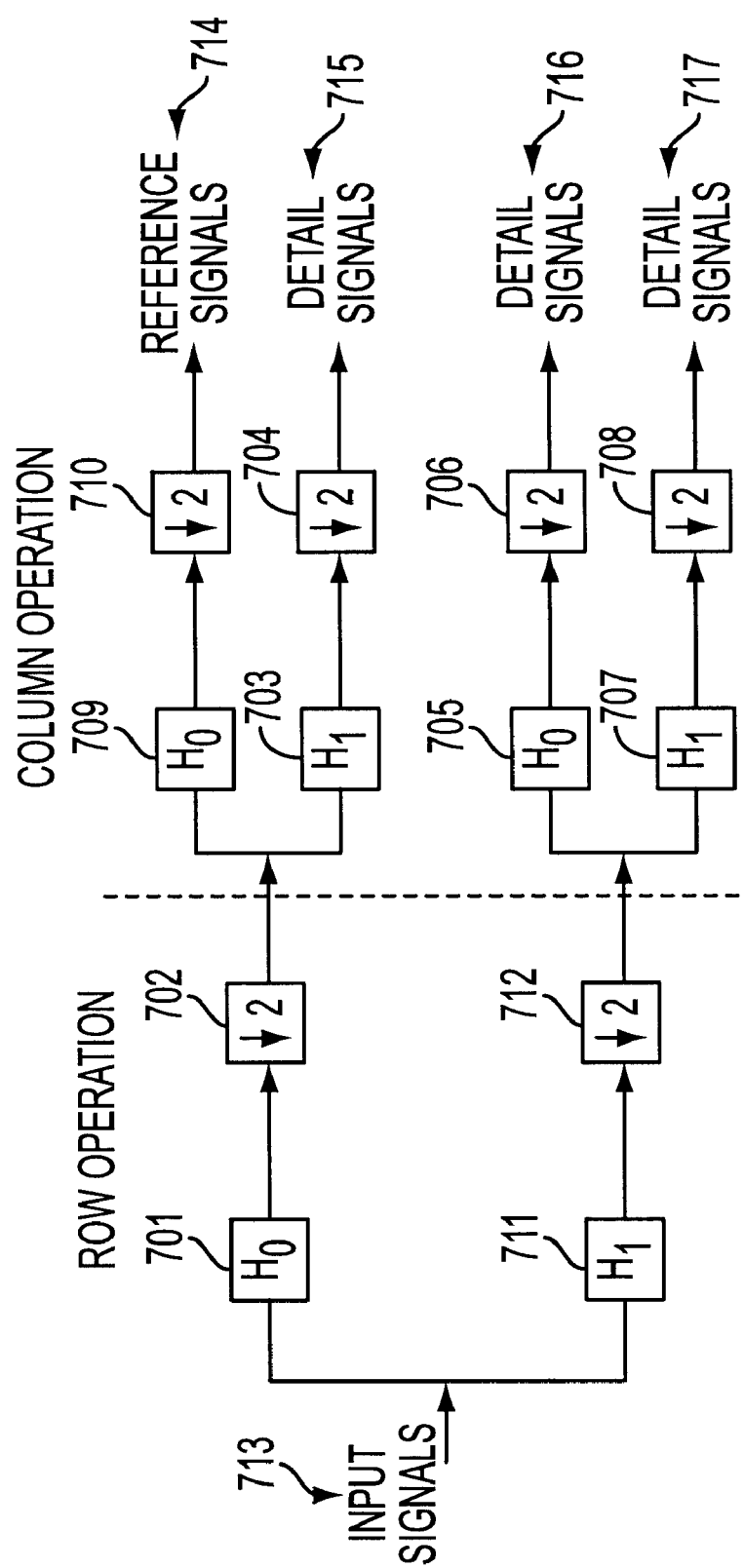
FIG. 7 shows a 2D DWT analysis in accordance with embodiments of the present invention.
Figure 8:
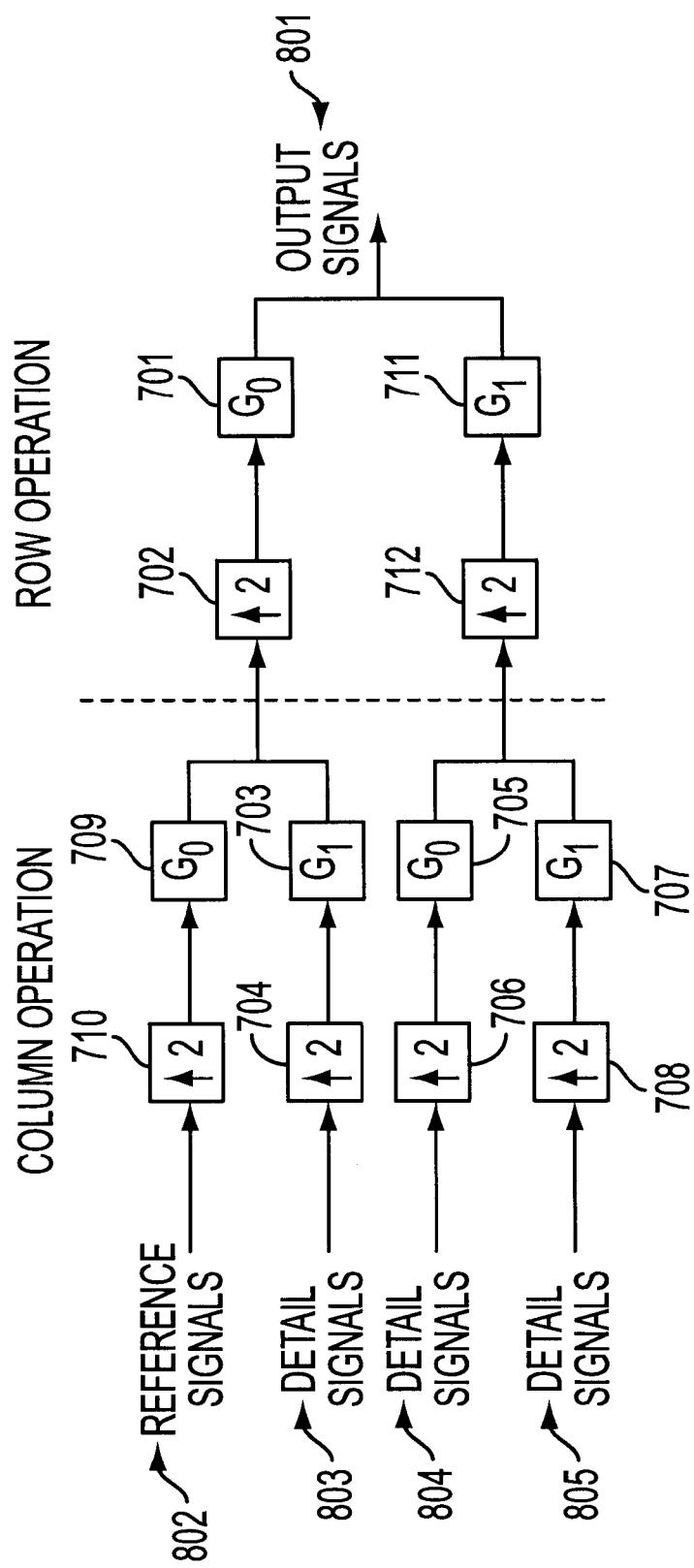
FIG. 8 shows another 2D IDWT analysis in accordance with embodiments of the present invention.

The 1D DWT may be extended to a 2D DWT. The analysis of the 2D DWT is shown in FIG. 7, and the synthesis of the 2D DWT is shown in FIG. 8. In the analysis of the 2D DWT, separable filter banks are applied first horizontally and then vertically to the input signal 713. Application of a filter bank comprising two filters, first horizontally then vertically, gives rise to an analysis in four frequency bands: horizontal low-vertical low 714, horizontal low-vertical high 715, horizontal high-vertical low 716, horizontal high-vertical high 717. Each resulting band is encoded according to its own statistics for transmission from a coding station to a receiving station. 701 represents the horizontal low filter. 711 represents the horizontal high filter. 705 and 709 represent the vertical low filters. 703 and 707 represent the vertical high filters. 702, 712, 710, 704, 706 and 708 represent the decimation function. In the synthesis of the 2D DWT, 801 represents the output signal and 802, 803, 804, 805 represent the input signals, which correspond to 714, 715, 716, and 717 respectively.

$$F_{a1}(z)=x(z)H_0(z) \qquad (6.a)$$

$$F_{a2}(z)=x(z)H_1(z) \qquad (6.b)$$

$$F_{a3}=1/2\{x(z^{1/2})H_0(z^{1/2})+x(-z^{1/2})H_0(-z^{1/2})\} \qquad (7.a)$$

$$F_{a4}=1/2\{x(z^{1/2})H_1(z^{1/2})+x(-z^{1/2})H_1(-z^{1/2})\} \qquad (7.b)$$

$$F_{a5}=1/2\{x(z)H_0(z)+x(-z)H_0(-z)\} \qquad (8.a)$$

$$F_{a6}=1/2\{x(z)H_1(z)+x(-z)H_1(-z)\} \qquad (8.b)$$

$$y(z)=1/2G_0\{x(z)H_0(z)+x(-z)H_0(-z)\}+1/2G_1\{x(z)H_1(z)+x(-z)H_1(-z)\} \qquad (9)$$

Smooth Filtering

Figure 9B:
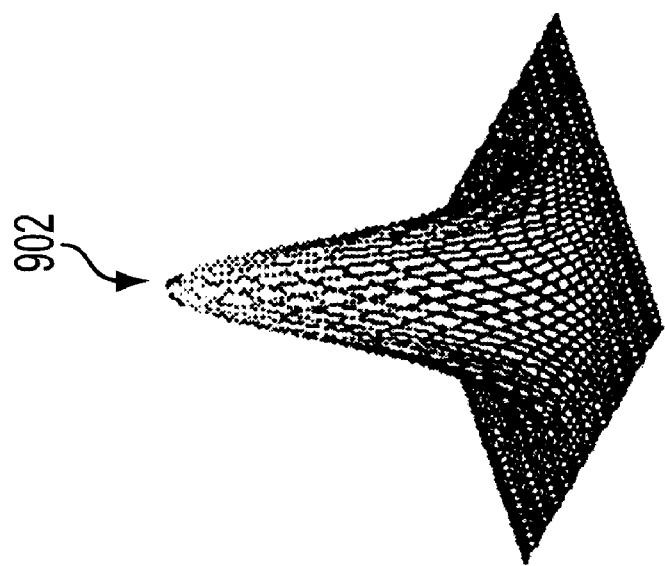
FIG. 9 shows an example of a smooth filter in accordance with embodiments of the present invention.
Figure 9A:
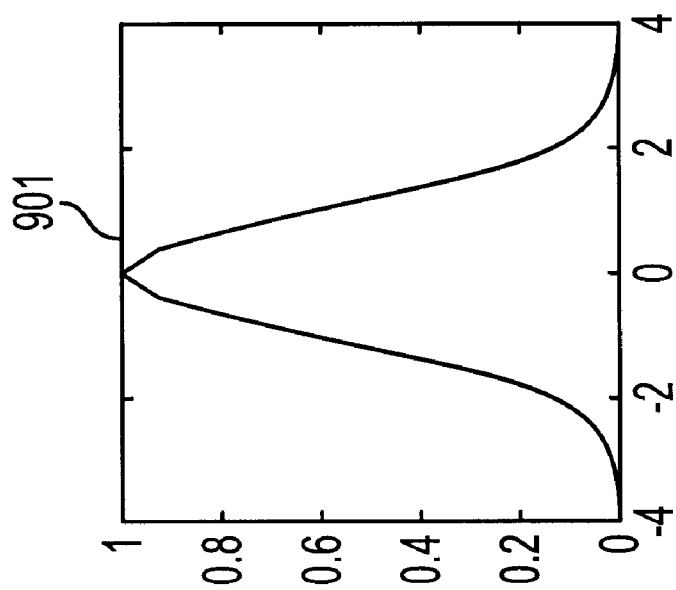

Smoothing filters are used to smooth objects and to remove noise after compression operations. Images are blurred when smoothing filters are applied, thus it is important to define the object within which the smoothing filters are applied. An example of a smoothing filter is a 1D/2D low pass filter function 901 and 902. A smooth filter using a 1D/2D Gaussian function is shown in FIG. 9.

Enhance Filtering

Figure 10B:
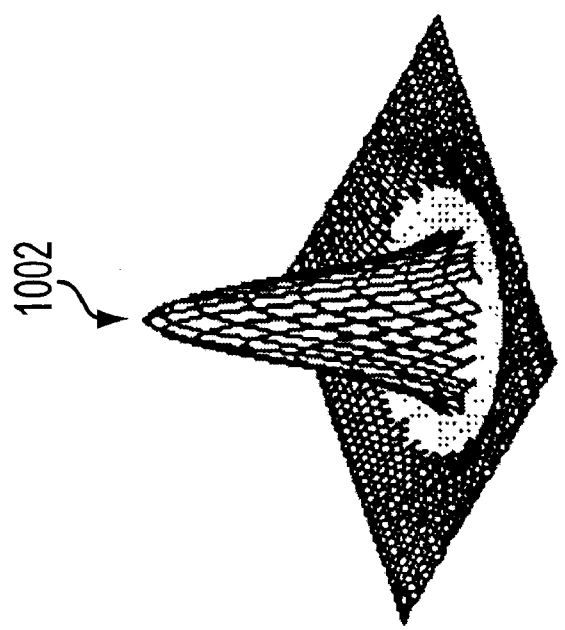
FIG. 10 shows an example of an edge-enhancement filter in accordance with embodiments of the present invention.
Figure 10A:
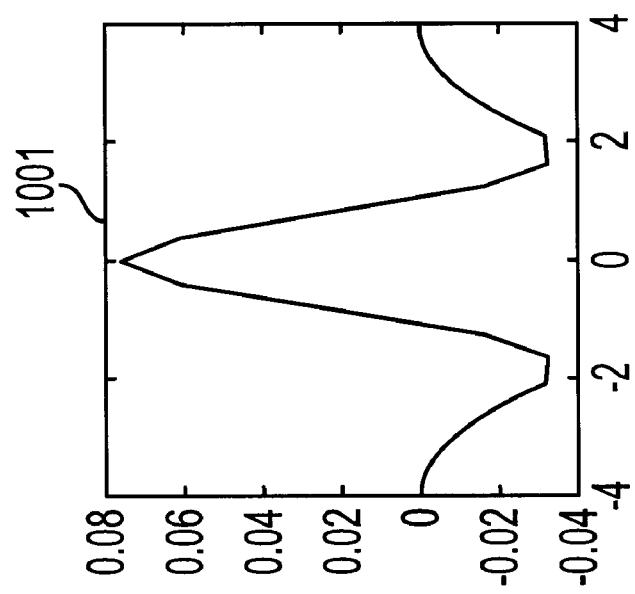

Since images are mostly smooth (except for occasional edges), it may be appropriate that an exact reconstruction sub-band coding scheme for image analysis should correspond to an orthonormal basis with a reasonably smooth wavelet. In order to have fast computation, the filter may be appropriately short. 1D/2D high pass filter functions are used as enhance filters. As an example, an enhance filter using a 1D/2D Mexican hat ($2^{nd}$ derivative of Gaussian function) is shown in FIG. 10, elements 1001 and 1002.

What is claimed is:

1. A system for processing an image comprising:

a resizing circuit for receiving an input image and for generating a resized image based at least in part upon the input image;

an edge extraction circuit for extracting edges from the resized image and for generating an edge-extracted image based at least in part upon the extracted edges;

an object extraction circuit for extracting objects from the edge-extracted image and for generating a mask image and a background region based at least in part upon the extracted objects; and a combination circuit for combining the resized image, the mask image, and a filtering operation, and for generating an enhanced image based at least in part upon the combination;

wherein the filtering operation includes a plurality of enhance filter coefficients for filtering the mask image and a plurality of smooth filter coefficients for filtering the background region.

2. A system in accordance with claim 1, wherein the edge extraction circuit comprises a horizontal edge extraction circuit and a vertical edge extraction circuit for extracting horizontal and vertical edges, respectively, and wherein the object extraction circuit comprises a dilation circuit and an erosion circuit for adding and removing pixels to and from edge boundaries, respectively.

3. A system for processing an image comprising:

a resizing circuit for receiving an input image and for generating a resized image based at least in part upon the input image;

an edge extraction circuit for extracting edges from the resized image and for generating an edge-extracted image based at least in part upon the extracted edges;

an object extraction circuit for extracting objects from the edge-extracted image and for generating a mask image based at least in part upon the extracted objects;

a first combination circuit for combining a quadrature of the resized image with data from the input image and for generating an enhanced quadrature based at least in part upon the first combination;

a second combination circuit for combining the enhanced quadrature, the mask image, and a filtering operation, and for generating a doubly enhanced quadrature based at least in part upon the second combination; and a transform circuit for performing an inverse discrete wavelet transform on the doubly enhanced quadrature and for generating an enhanced image based at least in part upon the transform.

4. A system in accordance with claim 3, wherein the filtering operation includes a plurality of enhance filter coefficients relating to a second derivative of a Gaussian function.

5. A system in accordance with claim 4, wherein the filtering operation includes a plurality of smooth filter coefficients relating to a Gaussian function.

6. A method for processing an image comprising the steps of:

receiving an input image;

generating a resized image based at least in part upon the received input image;

extracting edges from the resized image;

generating an edge-extracted image based at least in part upon the extracted edges;

extracting objects from the edge-extracted image;

generating a mask image and a background region based at least in part upon the extracted objects;

combining the resized image, the mask image, and a filtering operation; and generating an enhanced image based at least in part upon the combination, wherein the filtering operation includes a plurality of enhance filter coefficients for filtering the mask image and a plurality of smooth filter coefficients for filtering the background region.

7. A method in accordance with claim 6, wherein the step of extracting edges includes separately extracting horizontal and vertical edges, and wherein the step of extracting objects includes adding and removing pixels to and from edge boundaries, respectively.

8. A method for processing an image comprising the steps of:

receiving an input image;

generating a resized image based at least in part upon the received input image;

extracting edges from the resized image;

generating an edge-extracted image based at least in part upon the extracted edges;

extracting objects from the edge-extracted image;

generating a mask image based at least in part upon the extracted objects;

combining a quadrature of the resized image with data from the input image;

generating an enhanced quadrature based at least in part upon the combination;

combining the enhanced quadrature, the mask image, and a filtering operation;

generating a doubly enhanced quadrature based at least in part upon the combination;

performing an inverse discrete wavelet transform on the doubly enhanced quadrature; and generating an enhanced image based at least in part upon the transform.

9. A method in accordance with claim 8, further comprising the step of:

performing a discrete wavelet transform on the resized image to generate the quadrature of the resized image.

10. A method in accordance with claim 9, wherein the step of extracting edges includes separately extracting horizontal and vertical edges, and wherein the step of extracting objects includes adding and removing pixels to and from edge boundaries, respectively.

11. A computer readable medium having computer-executable instructions for performing steps comprising:

receiving an input image;

generating a resized image based at least in part upon the received image;

extracting edges from the resized image;

generating an edge-extracted image based at least in part upon the extracted edges;

extracting objects from the edge-extracted image;

generating a mask image and a background region based at least in part upon the extracted objects;

combining the resized image, the mask image, and a filtering operation; and generating an enhanced image based at least in part upon the combination, wherein the filtering operation includes a plurality of enhance filter coefficients for filtering the mask image and a plurality of smooth filter coefficients for filtering the background region.

12. The computer readable medium of claim 11, wherein the step of extracting edges includes separately extracting horizontal and vertical edges, and wherein the step of extracting objects includes adding and removing pixels to and from edge boundaries, respectively.

13. A computer readable medium having computer-executable instructions for performing steps comprising:

receiving an input image;

generating a resized image based at least in part upon the received input image;

extracting edges from the resized image;

generating an edge-extracted image based at least in part upon the extracted edges;

extracting objects from the edge-extracted image;

generating a mask image based at least in part upon the extracted objects;

combining a quadrature of the resized image with data from the input image;

generating an enhanced quadrature based at least in part upon the combination;

combining the enhanced quadrature, the mask image, and a filtering operation;

generating a doubly enhanced quadrature based at least in part upon the combination;

performing an inverse discrete wavelet transform on the doubly enhanced quadrature; and generating an enhanced image based at least in part upon the transform.

14. The computer readable medium of claim 13, wherein the computer readable medium also has computer-executable instructions for performing the step comprising:

performing a discrete wavelet transform on the resized image to generate the quadrature of the resized image.

15. The computer readable medium of claim 14, wherein the step of extracting edges includes separately extracting horizontal and vertical edges, and wherein the step of extracting objects includes adding and removing pixels to and from edge boundaries, respectively.

16. A system for processing an image comprising:

a first resizing circuit for receiving an input image and for generating a resized image based at least in part upon the input image;

an edge extraction circuit for extracting edges from the resized image and for generating an edge-extracted image based at least in part upon the extracted edges;

an object extraction circuit for extracting objects from the edge-extracted image and for generating a mask image based at least in part upon the extracted objects;

a first combination circuit for combining the resized image, the mask image, and a first filtering operation, and for generating an enhanced image based at least in part upon the first combination;

a second resizing circuit for receiving the enhanced image and for generating a resized enhanced image based at least in part upon the enhanced image;

an edge extraction circuit for extracting edges from the resized enhanced image and for generating an edge-extracted enhanced image based at least in part upon the extracted edges;

an object extraction circuit for extracting objects from the edge-extracted enhanced image and for generating a second mask image based at least in part upon the extracted objects;

a second combination circuit for combining a quadrature of the resized enhanced image with data from the enhanced image and for generating an enhanced quadrature based at least in part upon the second combination;

a third combination circuit for combining the enhanced quadrature, the second mask image, and a second filtering operation, and for generating a doubly enhanced quadrature based at least in part upon the third combination; and a transform circuit for performing an inverse discrete wavelet transform on the doubly enhanced quadrature and for generating an enhanced output image based at least in part upon the transform.

* * * * *